United States Patent [19]

Marshall

[11] Patent Number: 4,728,262

[45] Date of Patent: Mar. 1, 1988

[54] EROSION RESISTANT PROPELLERS

[75] Inventor: Darwin Marshall, Tonawanda, N.Y.

[73] Assignee: Textron Inc., Providence, R.I.

[21] Appl. No.: 821,327

[22] Filed: Jan. 22, 1986

[51] Int. Cl.$^4$ ............................................. F01D 5/14
[52] U.S. Cl. ................................. 416/224; 416/241 R
[58] Field of Search ............... 416/224, 241 R, 241 B, 416/203

[56] References Cited

U.S. PATENT DOCUMENTS

| | | | |
|---|---|---|---|
| 1,050,488 | 1/1913 | Plaine | 416/222 |
| 1,255,650 | 2/1918 | Samuelson | 416/203 |
| 1,335,002 | 3/1920 | Johnson | 416/224 |
| 1,674,674 | 6/1928 | Wooster | 416/224 |
| 1,842,178 | 1/1932 | Kempton | 416/229 |
| 3,215,511 | 11/1965 | Chisholm et al. | 416/241 B |
| 3,275,295 | 9/1966 | Caldwell et al. | 416/224 |
| 3,315,941 | 4/1967 | Davies | 415/178 |
| 3,420,329 | 1/1969 | Moore | 180/118 |
| 3,782,494 | 1/1974 | Simpson | 180/124 |
| 3,800,905 | 4/1974 | Wright et al. | 180/117 |
| 3,844,728 | 10/1974 | Copley et al. | 29/191.6 |
| 4,471,008 | 9/1984 | Huther | 416/241 B |
| 4,575,047 | 3/1986 | Boos et al. | 416/241 B |

FOREIGN PATENT DOCUMENTS

| | | | |
|---|---|---|---|
| 10806 | 1/1979 | Japan | 416/224 |
| 71688 | 6/1981 | Japan | 416/224 |
| 502 | 1/1984 | Japan | 416/224 |
| 215905 | 12/1984 | Japan | 416/230 |
| 338683 | 11/1930 | United Kingdom | 416/224 |
| 233693 | 12/1968 | U.S.S.R. | 416/224 |
| 678193 | 8/1979 | U.S.S.R. | 416/224 |

OTHER PUBLICATIONS

AFML-TR-69-287, Part II, J. Morris, Jr.—Sep. 1969, Mechanistic Investigation of Rain Erosion.
Textron Bell Aerospace Co. Technical Report AFML-TR-70-265, J. Morris, Jr. & N. E. Wahl—Nov. 1970, Erosion Characteristics of Aerospace Material.

*Primary Examiner*—Robert E. Garrett
*Assistant Examiner*—John T. Kwon
*Attorney, Agent, or Firm*—Bean, Kauffman & Bean

[57] ABSTRACT

An improved propeller blade for use in an environment subjecting the blade to particulate impacts tending to erode the dynamic profile of the blade, and which is carried by a rotatable hub and extends radially therefrom, whereby the blade bends in cantilever fashion and twists axially of its length during operation. The blade may be either of the aluminum alloy type or of a resinous molded matrix type with reinforcing inclusions, and is cut away along its leading edge to accommodate therein a plurality of serially aligned but separate erosion resistant implants. The implants are formed of a silicon based ceramic material and are externally shaped to complement in profile continuity the prescribed efficient dynamic profile of the blade, and there is employed a novel system for restraining the implants against dislodgements during operation of the propeller.

5 Claims, 7 Drawing Figures

U.S. Patent  Mar. 1, 1988  Sheet 1 of 2  4,728,262
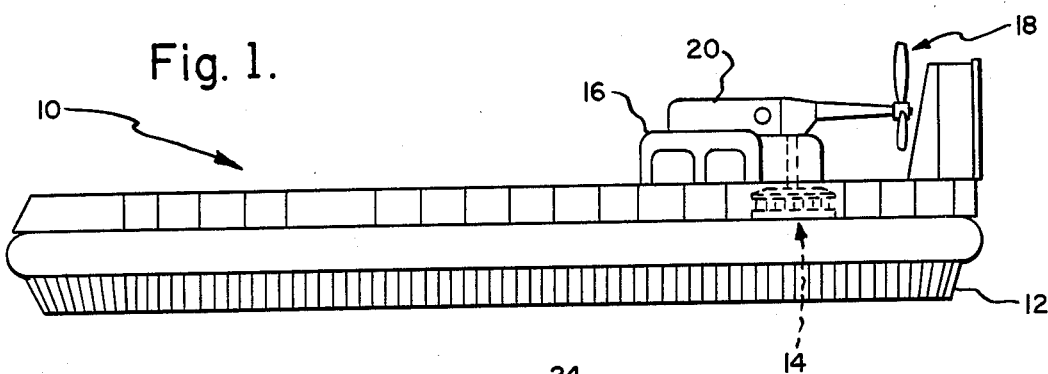
Fig. 1.
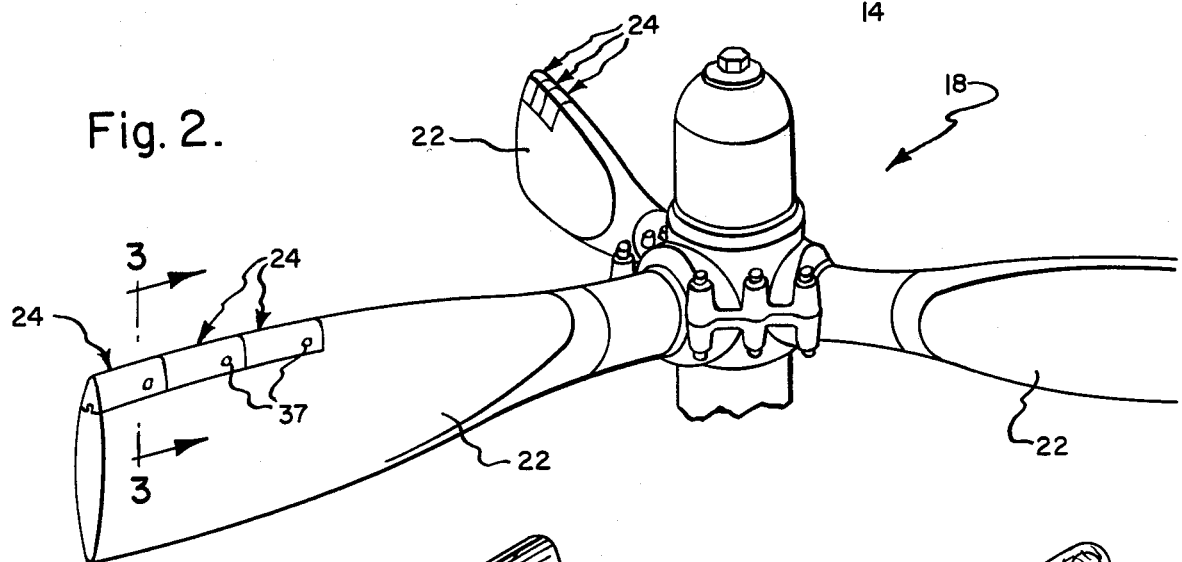
Fig. 2.
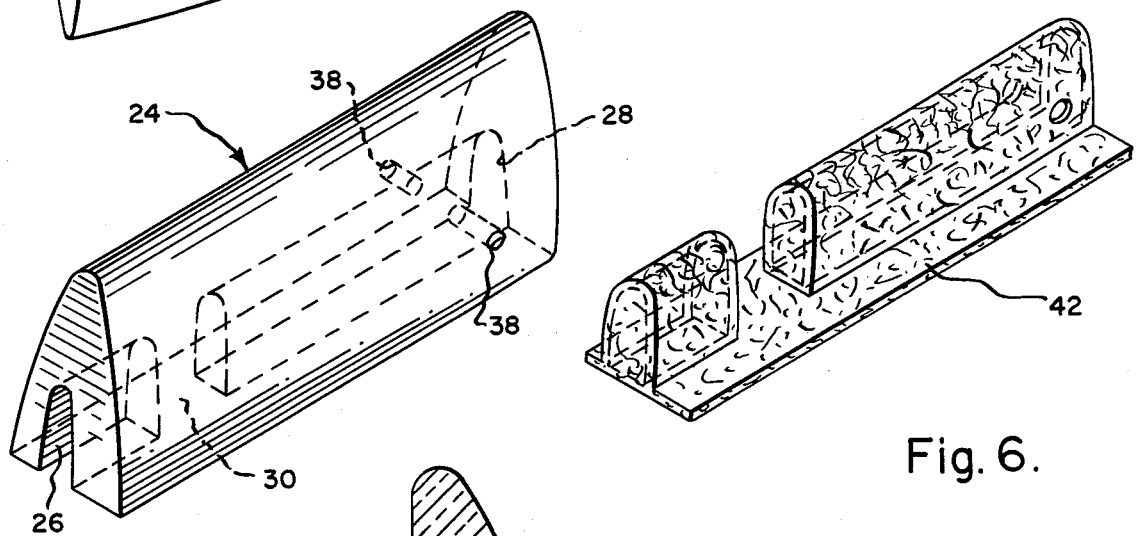
Fig. 5.
Fig. 6.
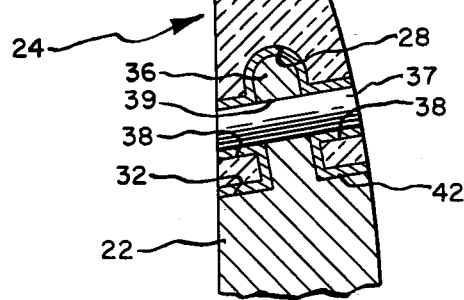
Fig. 3.

4,728,262

EROSION RESISTANT PROPELLERS

BACKGROUND AND OBJECTS OF THE INVENTION

This invention relates to vehicles of the amphibious air cushion vehicle (ACV) type; and more particularly to improvements in propulsion propeller therefor. Such vehicles typically employ aerodynamic type propellers operating at maximum safe rotational speeds for driving such vehicles over water, land, swamp, or ice surfaces, or the like; and the present invention is specifically directed to combating the extraordinarily severe propeller blade shape erosion problems encountered by ACV type vehicles during typical operational missions, whereby they are called upon to travel over a variety of disparate terrain conditions.

For example, when such vehicles are being employed for use in precisely scheduled commercial transport programs or for transport of supplies or troops from off-shore carriers onto a land-based beach or the like, the blades of the vehicle propulsion propellers are alternately subjected to ingestions of sprays of salt water and rain water "droplets" and air streams carrying sand (or other terrain-based particular materials). The hyper-velocity impactions of such droplets and/or solid particulates against the rapidly rotating propeller blades result in unduly rapid erosion of the initially efficient blade section profiles at the tip and leading edge portions thereof, resulting in serious propeller performance deterioration problems.

The problems of impeller/propeller blade erosion when operating in various abrasive environments such as in the slower moving turbine engine and pump industries has long been encountered, and a variety of means for amoring the blades have been devised and employed with some success. Such means typically include leading edge overlays of stainless steel or coatings of abrasion resistant hard metals or elastomers, and the like. Such devices as well as ways and means for attaching them to the blades are disclosed for example in U.S. Pat. Nos. 1,050,488; 1,255,650; 1,335,002; 3,315,941 and 3,844,728. However, the present invention relates to the protection of propeller blades of the type which are cantilever rooted in a propeller hub and extend therefrom radially in elongated form, whereby they are subjected in normal operation to forces compelling them to undergo cyclical bending and axial twisting gyrations.

Reference to and proposed solutions to such problems to which the present invention relates appear in Technical Report AFML-TR-69-287, PART II, John W. Morris, Jr., Sept. 1969, and "TEXTRON'S BELL AEROSPACE CO. TECHNICAL REPORT" AFML-TR-265, John W. Morris, Jr. and Norman E. Wahl, Nov. 1970. These publications elaborate upon and are useful in understanding the problems confronting the research resulting in the present invention.

As explained hereinabove, propellers of ACV type vehicles designed for missions as above described are typically subject to not only a cost-effectiveness problem, but are in a unique category because in event propeller failures occur after only a few hours of operation and before completion of a timed delivery commitment, it may be necessary to abort the mission. Accordingly, the search for suitable means for ensuring a substantially extended efficient operational life of a propeller blade for employment in such situations has now become a top priority project. However, in order to advance this art, the abrasion guard system needs not only to be of maximum erosion resistance, but must also be of such characteristics as are uniquely qualified to be adapted to accommodate and service against the encountered blade twisting and bending gyrations, as well as being compatible with the physical and chemical properties of the material from which the blades per se are constructed.

Therefore, the object of this invention was to provide an improved propeller blade of the type which basically comprises a strong aluminum alloy, or a resinous matrix with reenforcing inclusions and which is armored in combination therewith by highly resistant to corrosion means of such physical and chemical properties as to avoid stress concentrations at the blade and armor interface; whereby the composite blade would be of markedly improved operationally efficient extended life capability.

It was earlier recognized that ceramic materials with glassy, smooth surfaces have a basic advantage over most other materials for the purpose of shunting away particles impinging thereagainst, but also that most inorganic ceramics tend to brittlize and fracture under fairly low impact loads. Accordingly, research was initially directed to the basic problem of finding an erosion resistant ceramic such as would overcome the tendency as in the case of most inorganics to fail brittlely under fairly low impact loads. However, it was also noted that inasmuch as aerodynamic propeller blades of the type to be dealt with are relatively long and slender and twist and bend when in operation (as distinguished from turbine type blades), for use in accordance with the present invention the erosion armor arrangement for such purposes must be able to accommodate differential stress fluctuations along extended impact surfaces without tensile failure. Also, it must be of adequate yield strength in order to ensure suitable elastic response to the compressive loads imposed thereon by impacts of the order encountered in this art. Subsequent research, trials and tests of a large variety of combinations of basic blade and implant guard materials resulted in discovery of the present invention; and as a result propeller blades are now being fabricated which successfully survive the operating efficiency requirements therefor some four times longer than blades embodying prior art armored blade proposals.

BRIEF DESCRIPTION OF THE INVENTION

The blade of the present invention may comprise a base structure fabricated of a hard and strong aluminum alloy material such as #7076 aluminum (which is also designated AMS 4137 A (1954)) or a composite comprising a matrix of resinous material having reenforcing inclusions such as graphite or fiberglass strands or fabrics or the like. In any case, the base structure has implanted therein at strategically located positions monolithic anti-pitting guards formed of a ceramic material of the class including $\alpha$-SiC, $\beta$-SiC, $\beta$-Si$_3$N$_4$, with or without reenforcing and toughening additions thereto such as for example silicon carbide whiskers, fibers, or particles of titanium diboride (TiB$_2$) or titanium carbide (TiC) or the like. The composite structure is shaped to provide optimum aerodynamic performance when operating at anticipated speeds over any variety of water and other terrain conditions.

Thus, the basic blade and armor components of the present invention are fabricated of materials having substantially similar specific gravity and compatible electrochemical characteristics, and it has been found that the armor components thereof are adapted to accommodate over a much longer period of time particle impact stresses without undergoing fracture or significant plastic deformation. In some cases, it may be preferred to include an impact force compliant layer of material between the blade and the ceramic guard system to avoid undesirable stress concentrations at interfacing brittle and ductile irregular surfaces, and to accommodate different heat expansion characteristics. Furthermore, inasmuch as it is typically preferred (for ease of replacement purposes) to design the guard system for mechanical attachments to the blade, the compliant layer may preferably be of a "liquid gasket" or adhesive nature, thereby lending added security to the attachments.

BRIEF DESCRIPTION OF THE DRAWINGS

FIG. 1 is a side elevational view of an ACV type vehicle embodying a propuolsion propeller(s) of the present invention;

FIG. 2 is a perspective view of a typical three bladed propeller such as may be employed therein, showing a preferred ceramic armor emplacement arrangement thereon in accordance with the invention;

FIG. 3 is an enlarged scale fragmentary sectional view, taken as along line 3—3 of FIG. 2;

FIG. 5 is a perspective view of a ceramic implant such as is adapted to be attached to the cut-away portion of the blade which is shown in FIG. 4;

FIG. 6 is a perspective view of a preformed cushion device such as may be employed between the implants and the basic blade construction as shown in FIG. 3.

DETAILED DESCRIPTION

Figure 4:
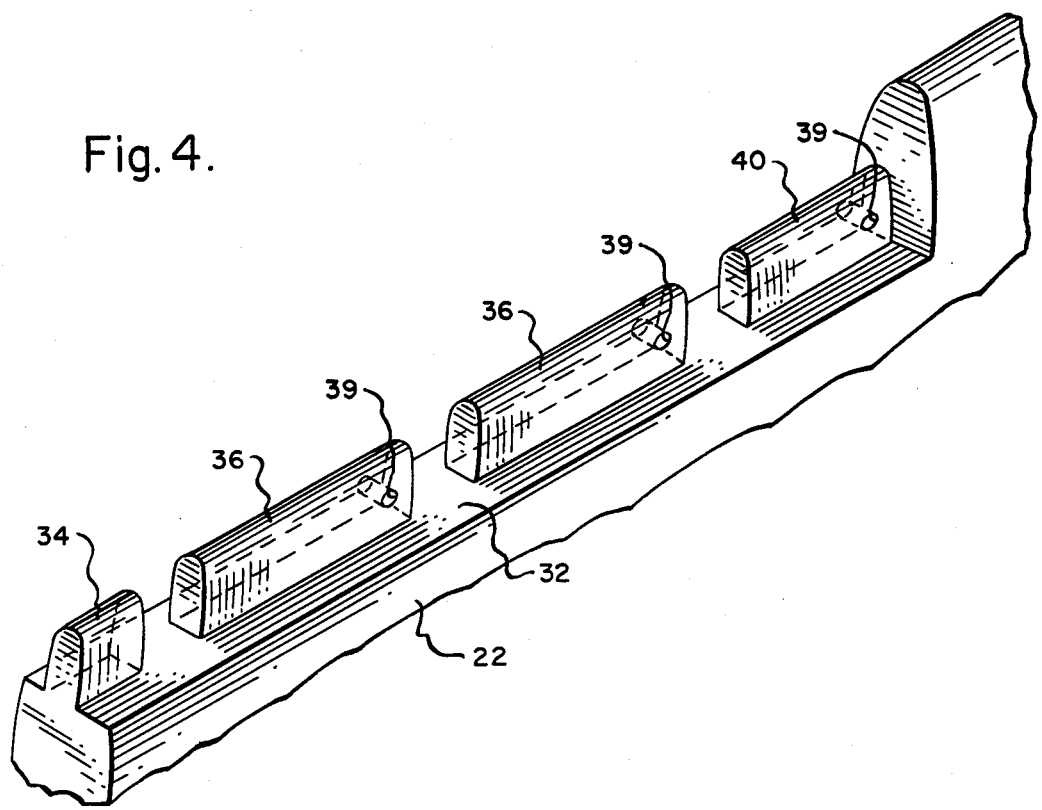
FIG. 4 is a fragmentary perspective view illustrating how in a preferred version of the invention the leading edge portion of a propeller blade is machined to provide a cut-away portion to accommodate a series of erosion resistant implants in accordance with the invention.

FIG. 1 of the drawing herewith illustrates a typical ACV vehicle of the type employing improved propulsion propellers of the present invention. The ship comprises a hull 10 which is peripherally margined by a depending inflatable trunk and skirt system as shown at 12. One or more lift air supply fans such as shown at 14 are mounted interiorly of the hull 10, and operate to pump air from exteriorly of the hull such as by means of a duct system 16 down into the air cushion space under the hull within the confines of the skirt or trunk system. One or more propulsion propellers as shown at 18 are mounted on top of the hull and arranged to be engine-driven such as by means shown at 20 for propelling the vehicle over water or land or like surfaces. ACV vehicles of this type are shown for example in U.S. Pat. Nos. 3,420,329; 3,782,494 and 3,800,905.

The propellers 18 may be of any suitable "air screw" type having any number of blades, but as illustrated herein by way of example the invention is shown as being embodied in a three-bladed type. In accordance with the present invention, each blade 22 of the propeller may be fabricated of a hard and strong aluminum alloy of the type such as is known in the trade as #7076 (or AMS 4137 A (1954)) or the like. These alloys have proven to be quite satisfactory for use in making such blades because of their light weight-to-strength and hardness characteristics. Alternatively, the blades may be formed of a resinous material with or without reenforcing inclusions. However, such blades of the prior art are highly susceptible to surface erosion as a result of high velocity impactions thereon by water droplets and solid particulates, whereby the initially efficient sectional profiles of new blades made of such materials suffer severe operative efficiency deteriorations in short order when the vehicle is operating under conditions hereinabove described. Such erosions are particularly excessive along the leading edges of such blades and at the trailing edges thereof.

In accord with a preferred mode of the present invention, the leading edge of each blade is armored by means of a string of separately fabricated inserts or implants such as are shown at 24 in the drawing herewith; such implants being molded of a ceramic material selected from the class including $\alpha$-SiC, $\beta$-SiC and $\beta$-Si$_3$N$_4$, and may or may not include reenforcing and toughening additions such as for example silicon carbide whiskers, fibers, strands or pariculates of titanium diboride (TiB$_2$) or titanium carbide (TiC). As best shown at FIGS. 3 and 5, these implants are externally shaped to complement when in place the shape of the blade per se in conformity with the ideal profile design of the blade, and are provided with means for attaching them in locked relation on the blade in continuation of the blade leading edge sectional profile design. Such means are shown by way of example in FIGS. 3, 4 and 5 herewith, wherein it will be noted that each implant 24 is partially grooved into its base portion leading thereinto from both ends of the implant. Thus, as shown by FIG. 5, the implant is provided with a groove 26 at one end thereof and with another groove as shown at 28 leading into the other end of the implant, leaving therebetween as shown by broken lines an ungrooved tongue portion 30. To accommodate the implants the edge portion of the blade 22 is cut away as shown at 32 (FIG. 4) so as to leave therewith integrally extending span-wise spaced apart buttresses 34, 36, and 40 which are shaped to complement the grooves 26 and 28 formed in the implants 24. Thus, the implants are adapted to nest firmly into and upon the cutout 32; and locking pins 37 are provided to be force-fitted into appropriate openings 39 through the buttresses 36 and 40, while being freely fitted in the implant openings 38. This obviates stress concentrations such as might lead to fracturing of the relatively brittle ceramic implants as will be more fully explained hereinafter.

The buttresses 34 and 36 are dimensioned so as to suitably withstand the shear and bending forces exerted thereon by the mass of the implant when the propeller is rotating at the highest operational speeds. The locations of the tongues 30 intermediately of the buttresses are such as to reduce the tensioned portion of the masses of the implants to a minimum while the larger masses of the implants are subjected to compressional stresses such as ceramics are competent to endure.

Figure 7:
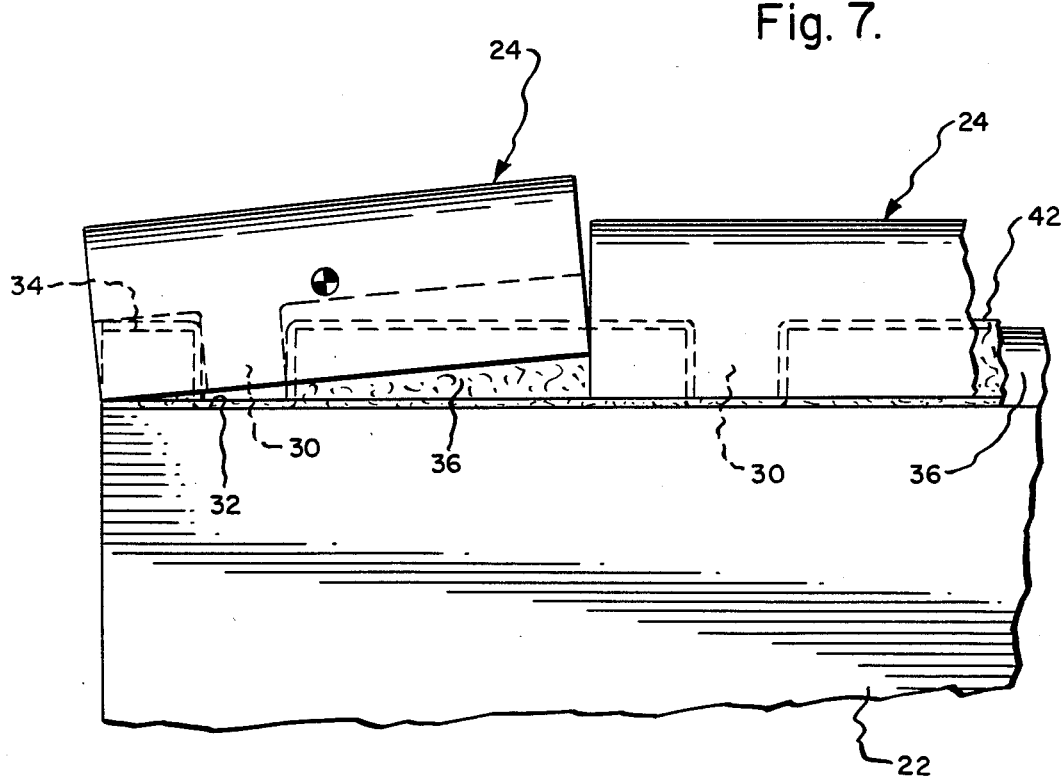
FIG. 7 is a fragmentary diagrammatic view illustrating how an erosion resistant implant which is not locked in place in accordance with the present invention tends to "spin off" the leading edge of the propeller in response to propeller rotation induced circumferential forces thereon.

Whereas the buttresses 36 and the tongues 30 of the implants also cooperate to oppose circumferential forces tending further to dislodge the implants, the pins 37 are so located lengthwise of each implant as to oppose tendencies thereof to spin off the blade when operating at high speeds. In operation, the implants are subjected to both radial and concomitant circumferential forces acting through the center of gravity of each implant. In the case of each implant, the next outboard buttress 36 resists the radial force thereon while the pin 37 opposed the circumferential force. Accordingly, the fluctuating violent twistings and bendings of the propeller blade tend to induce the implants to loosen from their seatings in the blade, whereupon the buttresses function as pivot bases against which the implants tend to slide and chafe against and when free to spin outwardly and off the blade as shown schematically in FIG. 7 of the drawing. In order to successfully counteract this tendency, the pins 37 of the invention are located lengthwise of the implants either in the region of or inboard (i.e. toward the hub) of the center of gravity of each implant as shown by way of example at FIGS. 2-5 herewith; and this is an important feature of the invention.

As shown at 42 (FIG. 3), a layer of compliant material is preferably included between each implant and the propeller blade per se in order to accommodate any surface irregularities so as to provide undesirable stress concentrations at the interfacing surfaces and to perfect the fit. Such a layer will also accommodate problems in event the blade and implant are of differential heat expansion characteristics. The layer 42 may be furnished in the form of a material of the type such as is sometimes referred to as a "liquid gasket", and such for example as is manufactured by Marston Lubricants Ltd. and designated Hylomer PL 32. Or, it may be of a flexible epozy adhesive nature such as a product made by the Hysol Div. of The Dexter Corporation, known as EA 921. Such a material may be brushed or smeared upon the cut-awayed portion of the blade, or alternatively the compliant layer may be provided as shown at FIG. 6 by means of preformed sheets of compliant material shaped to complement the interfacing surfaces of the implant and the propeller blade. Although it is preferred that the compliant layer in any case be of minimum thickness while sufficient to perform its mission, in the drawing herewith its thickness is exaggerated for clearness of illustration. It is of particular note that as best shown at FIG. 3 a film of compliant material (42) is provided between all interfacing surfaces of each implant and the propeller blade as well as between the locking pin 37 and the implant. Thus, the relatively brittle material of the implant is shielded from stress concentrations such as might otherwise cause fracturing of the implant, while at the same time being held firmly in place by the pin 37 against any tendency to "rattle" relative to the blade.

I claim:
1. A propeller blade which when operating is subjected to high velocity impacts of environmental material particulates causing erosion of its leading edge sectional profile, and is carried by a rotatable hub in radially extending relation therefrom whereby said blade undergoes substantial bending in cantilever fashion and twists axially of its length during propeller operation, including the improvement comprising:
   said blade being cut away along its leading edge portion so as to accommodate in serially aligned relation a plurality of erosion resistant implants which are formed of a silicon-based ceramic material and which are externally shaped so as to complement in profile continuity the prescribed sectional profile of said blade throughout the range of the array of said implants which extends to the tip of said blade;
   the cut away portion of said blade being periodically interrupted by a series of spaced apart integrally outstanding abutments occupying the recessed portions of said implants and accommodating therebetween integral tongue portions of said implants extending longitudinally intermediately thereof into the spaces beween said abutments and thereby cooperating to resist radially directed forces tending to dislodge and spin off said implants in radial directions when said blade is in operation; and
   pin means locking each of said implants relative to one of said abutments to resist tendencies of said implants to dislodge in response to circumferentially directed inertial forces thereon, said pin means extending in each case through one of said abutments and the side wall portions of the associated implant at longitudinal locations inboard thereof toward said hub relative to the center of mass of said associated implant.

2. A propeller blade as set forth in claim 1 wherein said pin means are force-fitted into said abutments while being loose-fitted in openings through said implants.

3. A propeller blade as set forth in claim 2 wherein a layer of shape compliant material is provided between said blade and each of said implants.

4. A propeller blade as set forth in claim 3 wherein said compliant material is of sheet form.

5. A propeller blade as set forth in claim 4 wherein said compliant material is of liquid adhesive form.

* * * * *